United States Patent
Hoffmann et al.

(10) Patent No.: US 6,792,352 B1
(45) Date of Patent: Sep. 14, 2004

(54) VEHICLE DATA BUS SYSTEM WITH POSITIONING MEANS

(75) Inventors: Stefan Hoffmann, Metzingen (DE); Peter Hoyland, Darmsheim (DE); Reiner Knapp, Holzgerlingen (DE); Michael Maehner, Boeblingen (DE); Matthias Schlutter, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/088,211
(22) PCT Filed: Sep. 7, 2000
(86) PCT No.: PCT/EP00/08735
§ 371 (c)(1), (2), (4) Date: Jul. 26, 2002
(87) PCT Pub. No.: WO01/20575
PCT Pub. Date: Mar. 22, 2001

(30) Foreign Application Priority Data

Sep. 15, 1999 (DE) .......................................... 199 44 177

(51) Int. Cl.[7] ............................................... G01C 21/26
(52) U.S. Cl. .......................... 701/213; 701/33; 701/216; 701/217; 342/357.11; 342/357.14; 342/462; 307/9.1; 307/10.1
(58) Field of Search .............................. 701/36, 48–49, 701/216–217, 220–221, 213, 207, 208, 210, 214, 29; 342/357.1, 357.11, 357.12, 450, 462, 357.01, 357.02, 357.03, 357.06, 357, 17, 357.14; 307/9.1, 10.1, 11–12, 38

(56) References Cited

U.S. PATENT DOCUMENTS

| | | | |
|---|---|---|---|
| 4,942,571 A | 7/1990 | Moeller et al. ............. | 370/407 |
| 5,247,440 A | * 9/1993 | Capurka et al. .............. | 701/49 |
| 5,644,317 A | 7/1997 | Weston et al. ......... | 342/357.14 |
| 5,740,049 A | 4/1998 | Kaise .......................... | 701/217 |
| 5,995,895 A | * 11/1999 | Watt et al. .................... | 701/50 |
| 6,067,501 A | * 5/2000 | Vieweg ....................... | 701/209 |
| 6,345,229 B1 | * 2/2002 | Honkomp et al. .......... | 701/207 |

FOREIGN PATENT DOCUMENTS

| | | |
|---|---|---|
| DE | 196 40 735 A1 | 10/1996 |
| DE | 197 18 822 A1 | 5/1997 |
| EP | 0 675 341 A1 | 3/1995 |
| EP | 0 789 343 A1 | 1/1997 |
| GB | 2 305 262 A | 2/1997 |
| WO | WO 98/10246 | 3/1998 |
| WO | 20 98/36288 | 8/1998 |

OTHER PUBLICATIONS

"Das Informationsmanagement–System Des Porsche 911 Carrera" Von Karl–Heinz Strobel, Mobile Kommunikation—pp. 88–99.
International Search Report and translation of pertinent portions thereof.
German Search Report and translation of pertinent portions thereof.

* cited by examiner

Primary Examiner—Jacques H. Louis-Jacques
(74) Attorney, Agent, or Firm—Crowell & Moring LLP

(57) ABSTRACT

A vehicle data bus system includes locating means which comprise a locating computing unit and a locating sensor system which contains at least one GPS receiver with associated GPS antenna and gyro data acquisition means, and a data bus via which connects a plurality of bus users in data communication with one another. The locating means contain a locating module which is embodied as one of the bus users and is configured to receive at least wheel speed data and forward/backward direction of travel data via the data bus, to acquire at least vehicle position data, direction of travel angle data, travel speed data and altitude position data as well as to output this acquired data onto the data bus. For this purpose, the locating module contains the location computing unit, the GPS receiver and a gyroscope or means for the bus-end reception and evaluation of gyro data of a travel dynamics/traction control system.

10 Claims, 4 Drawing Sheets

VEHICLE DATA BUS SYSTEM WITH POSITIONING MEANS

This application claims the priority of PCT International Application No. PCT/EP00/08735, filed 07 Sep. 2000 and German patent document 199 44 177.4, 15 Sep. 1999, the disclosure of which is expressly incorporated by reference herein.

BACKGROUND AND SUMMARY OF THE INVENTION

The invention relates to a vehicle data bus system having a location determining arrangement that includes a locating computing unit and a locating sensor system having at least one GPS (Global Positioning System) receiver with associated GPS antenna and gyro data acquisition means, the data bus system also having a plurality of bus users connected to a data bus, for data transmission to one another.

European patent document EP 789 343 A1 discloses a vehicle data bus system of the generic type, having locating means and a plurality of connected bus users. GPS receivers, gyro data sensors, wheel speed sensors, tachometers, odometers and acceleration sensors can be used as locating sensor systems. A locating computing unit uses the data of the locating sensor system to determine the position data which can be output onto the data bus.

Motor vehicles of advanced design frequently include position determining devices that operate on the basis of the GPS, and when necessary, the latter are supported by further position-determining devices for compound navigation (for example, a gyroscope and an odometer). In addition, a plurality of vehicle-mounted components, (conventionally control devices referred to herein as "bus users", for performing local vehicle-mounted control functions), are frequently connected to one another via a data bus which can be part of an entire data bus network.

Recently, telematics service units are also becoming significant bus users. Such telematics service units have a communications connection, on the one hand, to the "vehicle world" via the vehicle data bus and, on the other hand, to remote stations, which are external to the vehicle, via one or more wireless transmission channels. They may be used for example, to perform functions such as emergency calls, pursuit of thieves, determination of traffic situation data of sample vehicles etc.

In earlier motor vehicles of this type, the locating devices on the one hand and the data bus with connected vehicle control devices on the other hand formed separate vehicle subsystems, and frequently only one of the two was implemented. The locating devices themselves were frequently composed of a relatively large number of individual components. U.S. Pat. No. 5,644,317 for example, discloses an automatic vehicle locating system having a locating sensor system composed of a plurality of individual sensor units, and a locating computing unit which receives output signals of the various locating sensor units. The locating computing unit outputs data relating to the vehicle position and vehicle situation to an external unit via a wireless communications channel for presentation of the transmitted position/situation data.

A vehicle-position-determining system disclosed in U.S. Pat. No. 5,740,049 determines a first temporary position information item by reference to the output signals of a vehicle speed sensor and a gyroscope, and corrects it by deriving a second temporary position information item by reconciliation with stored route data. A third temporary position information item is acquired from the output signal of a GPS receiver. By evaluating or reconciling the various temporary position information items, a definitive vehicle position is determined and displayed on a screen in a road map view.

The locating devices are often an integrated component connected upstream of a vehicle navigation unit, for the sole purpose of supplying position and situation data (i.e., orientation of the vehicle in space) data for navigation and/or for visually displaying determined position or situation of the vehicle. See, for example, European patent document EP 0 675 341 A1 and International patent document WO 98/36288 A1.

International patent document WO 98/10246 A1 discloses a device for recording geographic data which, depending on the configuration, can be determined as a portable device or for installation in a vehicle, for example, and has not only position-determining means but also video cameras for recording images. A computer unit receives the data output by the positioning-determining means and the video cameras and evaluates it to determine the direction of the image relative to the device, or the geographic data for an object sensed with the camera. The device can have a communications connection via a wireless communications channel to a remote station, for example a central processor unit there.

German patent document DE 196 40 735 A1 discloses a telematics device for a motor vehicle, which includes a car radio with an RDS module and a built-in locating system with GPS module, a radio telephone with GSM module, a memory and a display. The RDS module, the GPS module and the GSM module are installed together with a voice unit and the car radio in a housing of the telematics device. The housing has antenna terminals for at least the car radio, the GSM module and the GPS module as well as interfaces for at least one CAN bus and/or one further data bus as well as for at least one loudspeaker and/or a microphone. By means of travel sensors (for example wheel sensors, a direction sensor and/or the GPS modules the position of the vehicle can also be connected and output on a digital map of the visual display. By communicating with a control center or a navigation system which is built into the telematics device or a navigation module which can be connected thereto via the CAN bus or the further data bus, it is possible to calculate a desired travel route which is then displayed on the visual display. Via the CAN bus and/or the further data bus, the telematics device can influence an engine control unit which forms a further bus user.

One object of the invention is to provide a vehicle data bus system of the type described above which is flexible and convenient to use, and can be satisfactorily standardized.

This and other objects and advantages are achieved by the vehicle data bus system according to the invention, in which a locating module is embodied in a specific way as one of the bus users connected to the data bus. Components of the locating module which are used for locating the vehicle are integrated primarily into a single structural unit. The associated locating sensor system is at least partially integrated into the locating module and also connected to the data bus so that the locating module acquires at least part of the necessary locating sensor data internally, and also receives it via the data bus. Specifically, the locating module contains a locating computing unit, which performs the computational determination of a position, and a GPS receiver. In addition, it has a gyroscope or means for receiving corresponding gyro data via the data bus from a travel dynamics/traction control system if the latter comprises the respective gyro data acquisition sensor system (as, for example, in some conventional travel dynamics control systems).

As a result of the modular combination and the data bus connection of the locating apparatus, they can be standardized for use in different vehicles (and in different countries) without extensive adaptation measures, and can provide appropriate locating information on the data bus in a flexible way according to need, from which data bus users. The locating information which is thus made available comprises, in particular, vehicle position data, direction of travel angle data, travel speed data and altitude data (data on the instantaneous altitude position of the vehicle above sea level) (NN). In a preferred embodiment of the invention, a locating precision classification (location quality) is also provided in the form of an identifier which indicates the degree of unreliability of the calculated position data.

In order to determine the locating information, the locating module uses not only the gyro data and the GPS data, but also wheel speed data and data indicating whether the vehicle is driving forward or backward at a given time, which it obtains from the data bus. The locating information can be used, in particular for vehicle control units which perform various vehicle-related functions, such as travel dynamics control, anti-lock brake control, traction control, engine control and gearbox control, by display instruments such as a combination instrument or by a specific comfort information display, and also by communication units which communicate with vehicle-mounted components via the data bus and with remote components, external to the vehicle, via a wireless communications channel.

In another embodiment of the vehicle data bus system according to the invention, the structural unit which represents the locating module also contains an integrated GPS antenna so that it is unnecessary to mount a separate GPS antenna on the vehicle or to connect it to the locating module.

In still another embodiment of the invention, a navigation unit, which receives the position data from the locating module, is provided as a further bus user. By means of a conventional map-matching process in which this position data is compared with stored travel network data, it acquires improved position information with a new location position classification (location quality). The navigation unit characteristically feeds back the corresponding position correction data via the data bus to the locating module which can use said data for precision-improving correction reconciliation.

In yet another embodiment of the invention, one or more telematics service units are provided as further bus users, which use the locating data acquired from the locating module (for example for an emergency call function) to pursue thieves and/or to determine traffic situations using sample vehicles (what is referred to as a floating car data method).

According to another embodiment of the invention, an engine and/or a gearbox control unit, provided as a further bus user, utilizes the data bus connection, inter alia, to read in the altitude position data made available by the locating module. As a result, it is possible to dispense with an altitude sensor which is conventionally present in modern units of this type.

Finally, according to another feature of the invention, the locating module is part of a further bus user, which uses the locating computing unit for additional tasks.

Other objects, advantages and novel features of the present invention will become apparent from the following detailed description of the invention when considered in conjunction with the accompanying drawings.

DETAILED DESCRIPTION OF THE DRAWINGS

Figure 1:
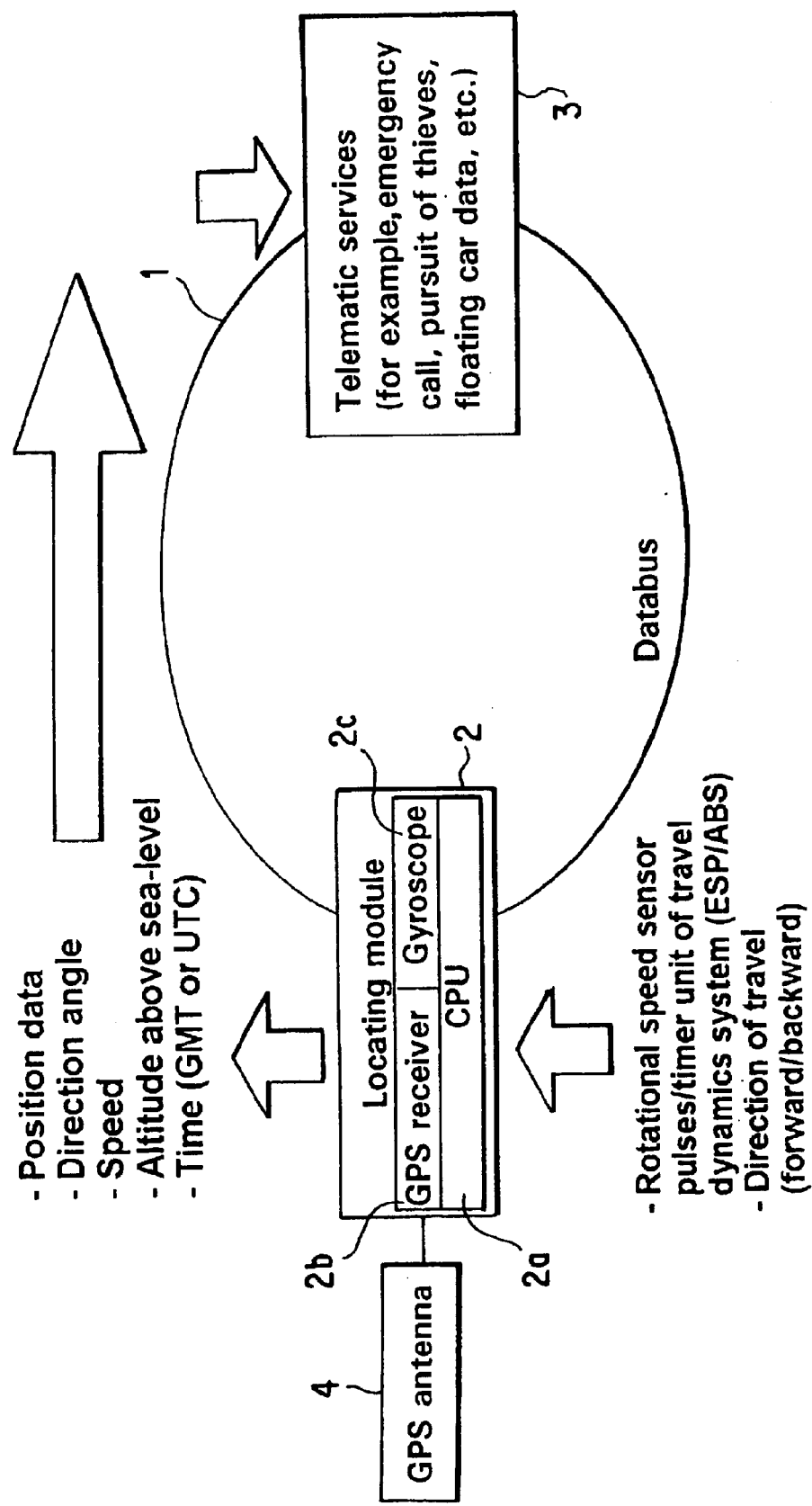
FIG. 1 is a partial schematic representation of a vehicle data bus system with locating module with integrated gyroscope and external GPS antenna according to the invention.

The vehicle data bus system which is illustrated in FIG. 1 (showing only those components which are of specific interest here) contains a data bus 1 to which a plurality of bus users are connected. Only a locating module 2 and a telematics service block 3 are shown explicitly, with one or more telematics service units for corresponding functionalities (for example emergency calls, pursuit of thieves and the determination of traffic situations using sample vehicles) being combined by the telematic service block 3, for simplicity. The locating module 2 is provided as a component that can be built on in a uniform fashion; it contains a locating computing unit 2a, a GPS receiver 2b and a gyroscope 2c in an integrated form in this example.

An external GPS antenna 4 which is mounted at a suitable location on the vehicle is connected to the GPS receiver 2b. The locating module 2 is coupled into the data bus 1 via a corresponding bus interface, from which it reads in wheel speed data and forward/backward direction of travel data. The wheel speed data can be supplied, for example, in the form of rotational speed sensor pulses per time unit by a travel dynamics/traction control system which also acquires this data for its own use, in a known manner. The travel dynamics/traction control system can be, for example, an anti-lock brake system (ABS) or a travel dynamics control system which is used by the applicant under the abbreviation ESP (electronic stability program). The forward/backward direction of travel data indicates whether the vehicle is travelling forward or backward at a given time, and can originate, for example, from reverse-gear detection means, which determine whether or not the reverse gear is engaged.

Data that are necessary for locating, which the locating module 2 does not acquire from the data bus 1, are supplied by the integrated locating sensor units, specifically GPS data of the GPS receiver 2b and gyro data of the gyroscope 2c. The locating computing unit 2a then carries out the actual computational locating process. (The term "locating" is used here in a broad sense, which includes both a determination of the position of the vehicle and its altitude, and orientation in space.) That is, the locating computing unit 2a determines vehicle position data with its locating precision classification (location quality), direction of travel angle data, travel speed data and altitude data (altitude of the vehicle above sea level (NN)) at a given time. The locating computing unit 2a also contains time-determining means which provide highly precise time information corresponding to a radio clock, the time valid in respective countries being given throughout the world, for example according to the GMT or UTC standard, without the user having to perform complicated menu settings for this purpose. The direction of travel angle data contains not only actual angle information but also offset, drift and scaling factor information.

The locating computing unit 2a feeds determined, conditioned locating data onto the data bus 1 where it is made available to the other bus users, for example to the telematics service units 3 and/or vehicle control units (not shown), for example engine and/or gearbox control unit, which are connected to the data bus 1. A connected engine or gearbox control unit can accept, in particular, the altitude position information made available by the locating module 2 on the data bus 1 and in this way does not require its own altitude sensor. When the system is started, the altitude value when the vehicle was last switched off is expediently used until current altitude position data is available again.

As is apparent from the explanations above, the locating module 2 performs a locating process using a plurality of parallel input information items, specifically the internally acquired GPS data, the internally acquired gyro data and the wheel speed data received via the data bus 1, which is also used by the locating module 2 to perform an odometer function.

Figure 2:
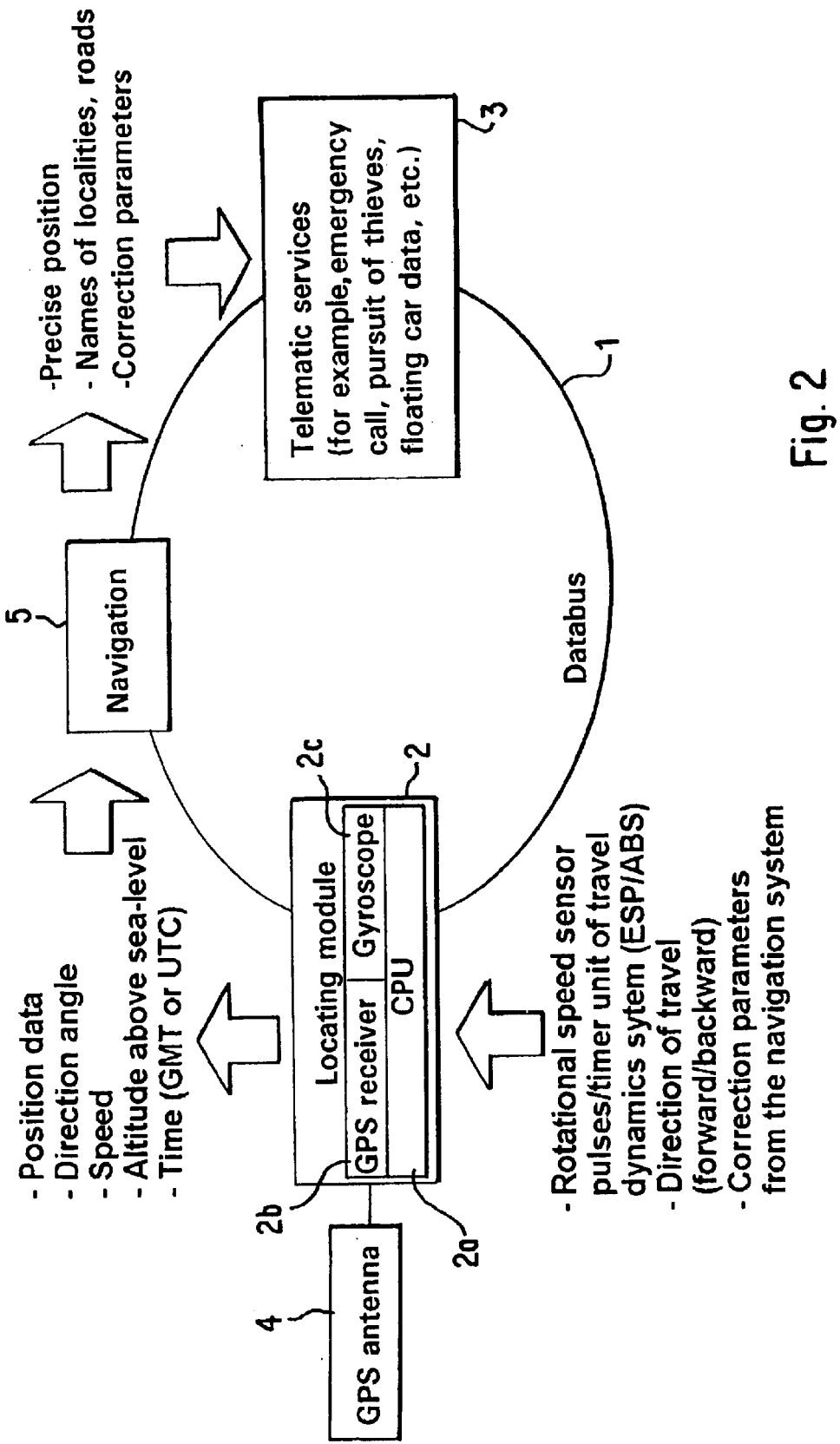
FIG. 2 shows a data bus system corresponding to FIG. 1, with an additional navigation unit.

The vehicle data bus system illustrated in FIG. 2 (again, with only those components which are specifically of interest here) corresponds essentially to that in FIG. 1. (Corresponding reference symbols are used for functionally identical elements.) The system in FIG. 2, however, contains a navigation unit 5 as a further bus user. The navigation unit 5 receives the various locating data items supplied by the locating module 2 via the data bus 1, and uses the received position data in a conventional map-matching process in which the vehicle position determined by the locating module 2 is reconciled with data in a digitally stored travel network map. In this manner, the navigation unit 5 determines a precision classification (locating quality) and outputs this and accompanying travel network information (such as names of localities and roads), onto the data bus 1. The bus users connected to the data bus 1 can then use for this purpose the precise vehicle position data made available by the navigation unit 5 if they require vehicle position data. This applies in particular also the telematics service units 3.

The navigation unit 5 also outputs onto the data bus 1 position correction data which represents the possible deviation of the precise vehicle position determined by it from the vehicle position determined by the locating module 2. The locating module 2 can obtain this fed-back position correction data or these correction parameters from the data bus 1 and use them for corresponding correction of the location which it determines, in order to improve the precision of the position-determining process.

Figure 3:
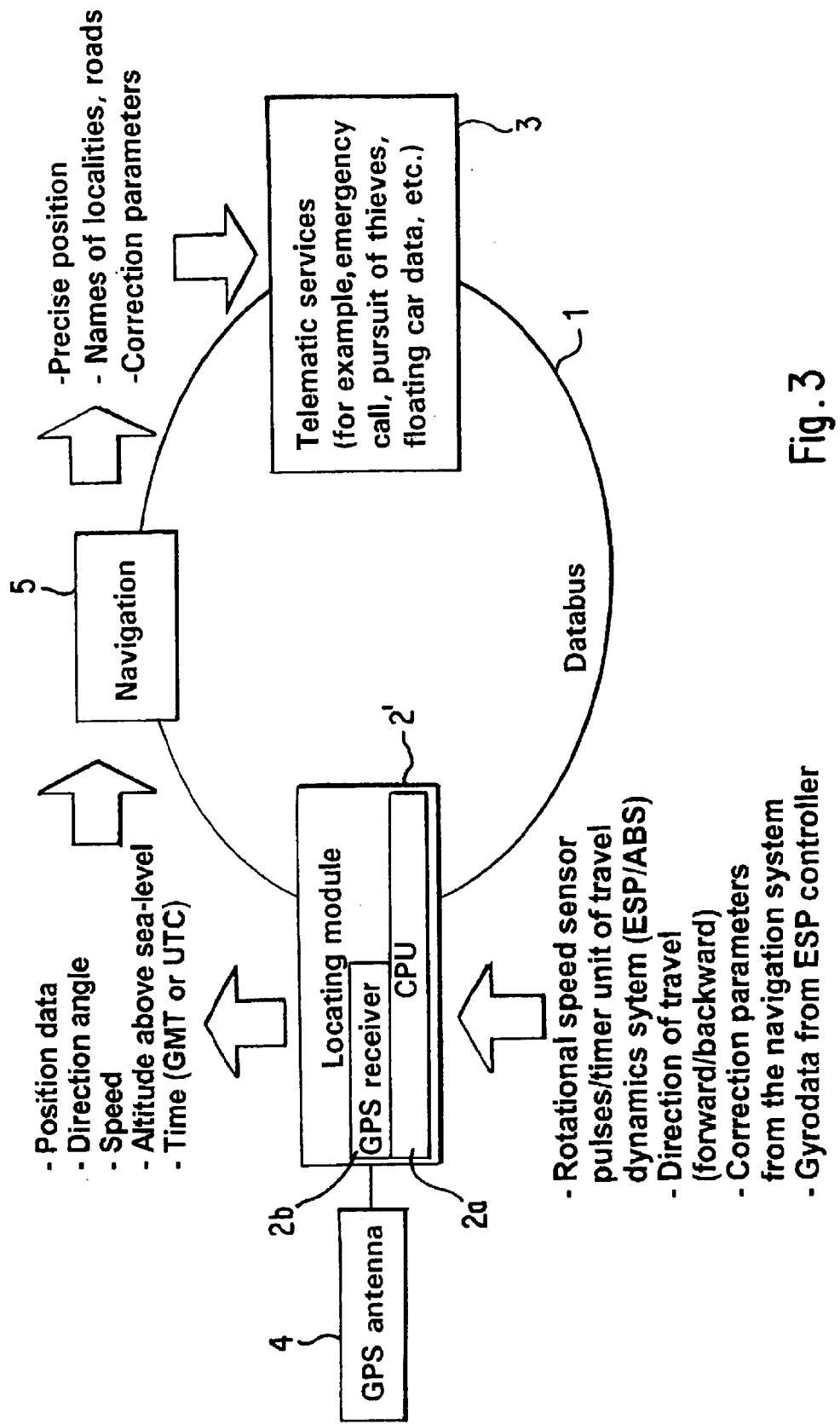
FIG. 3 shows a data bus system corresponding to that of FIG. 2, with a locating module which does not have a gyroscope and which receives gyro data from the bus.

The vehicle data bus system in FIG. 3 corresponds to that in FIG. 2, with a modified locating module 2' containing only the locating computing unit 2a and the GPS receiver 2b, but no gyroscope. In this case, the locating module 2' contains means for the bus-end reception and evaluation of gyro data of a travel dynamics/traction control system, e.g. by an ESP controller. This leads to satisfactory results if the gyro sensor means of the travel dynamics/traction control system have an adequate level of precision or efficiency and reliability. The travel dynamics/traction control system makes available the determined gyro data on the data bus 1, from where it can be called by the locating module 2'.

Figure 4:
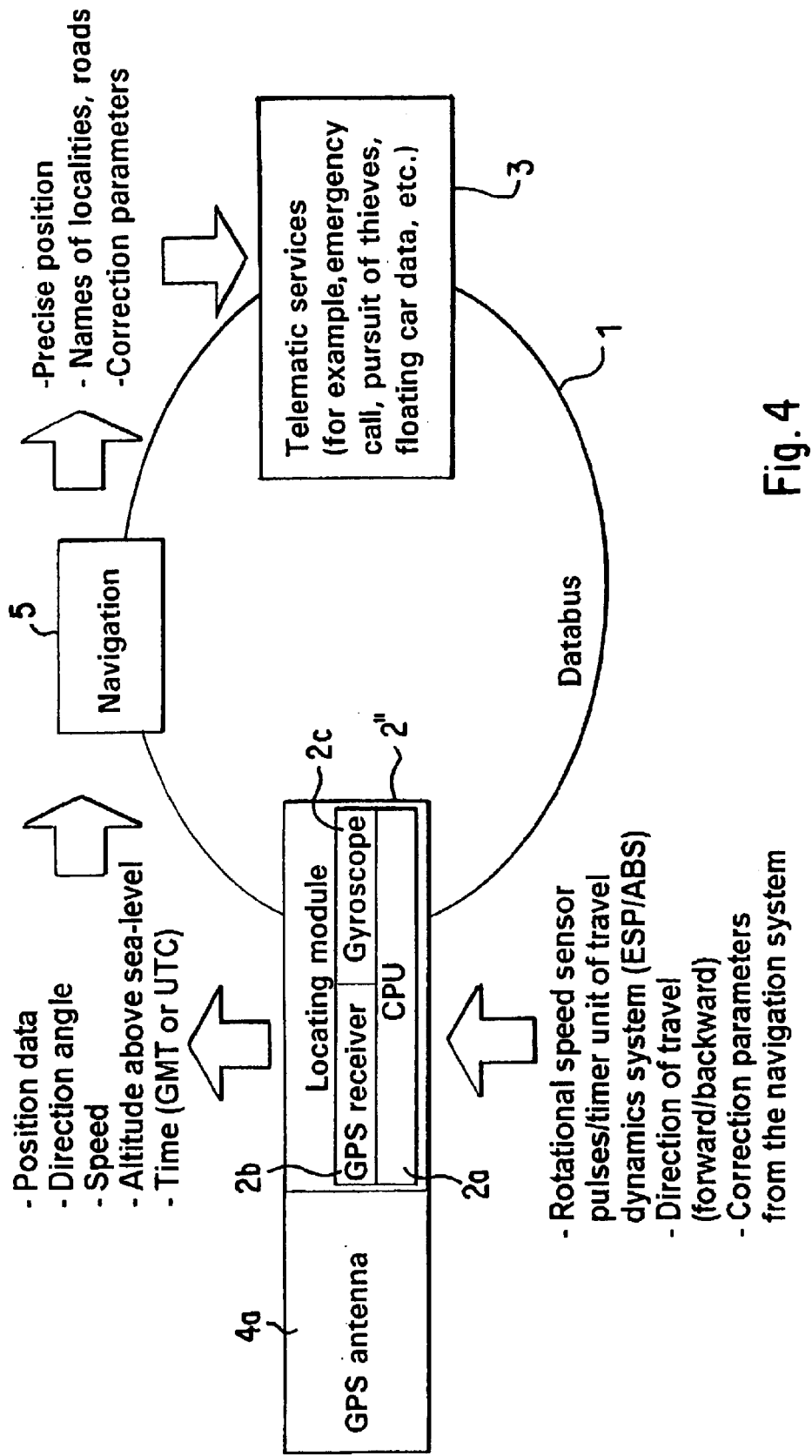
FIG. 4 shows a data bus system corresponding to FIG. 2, with GPS antenna integrated into the locating module.

The vehicle data bus system illustrated in FIG. 4 corresponds to that in FIG. 2, with a modified locating module 2", that also contains an integrated GPS antenna 4a. As a result, the need for an GPS antenna which is to be separately mounted on the vehicle and connected to the locating module is dispensed with.

As the above exemplary embodiments make clear, the present invention implements a vehicle data bus system in which a locating module which is implemented as a stand-alone structural unit (for example in the form of a separate box or plug-in module) is integrated into the bus system as a bus user and contains all the components which are used for determining locations and receives input information necessary for this purpose via the data bus. The locating module can be used as a small standard box throughout the world in a wide variety of vehicles without extensive adaptation measures. Even without an implemented navigation functionality or emergency call functionality, it is possible to use the location-related services, such as pursuit of thieves, the determination of traffic situations using sample vehicles etc. by means of the locating data supplied by the locating module.

The use of the locating data provided by the locating module makes the system independent of the manufacturers of communications devices which are used, such as telephone sets. The locating data of the locating module can be used to display the compass direction and/or degrees of longitude and of latitude of the current vehicle position, which can be helpful for breakdown information, for example. Furthermore, a high-precision clock with the display of the current time in any country throughout the world can be implemented without complicated menu settings by the user. The time can be displayed, for example, in a combination instrument or in an auxiliary heating module, so that the need for a separate clock chip can be avoided.

The use of altitude information of the locating module by an engine and/or gearbox electronic system makes it possible to avoid the need for a separate altitude sensor. The locating information which is made available by the locating module in a standardized form and which relates to the position, locating precision classification (locating quality), direction of travel angle, direction of rotation, altitude position, inclination of the vehicle, etc. can be used by means of the data bus in a flexible way by the various systems which are based on locating information, for, for example, emergency calls, calling taxis, navigation, devices which warn of imminent bends, the determination of traffic situations using sample vehicles, travel dynamics control systems, anti-lock brake systems, traction controllers, gearboxes, engine electronic systems, combination instruments and supplementary information.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle data bus system comprising:
   a data bus which connects a plurality of bus users in data communication with one another; and
   locating apparatus, including a locating module connected as one of the bus users, said locating module being configured to determine vehicle position data, direction of travel angle data, and travel speed data and to output this determined data onto the data bus; wherein,
   the locating module has a locating computing unit and a locating sensor system which comprises at least a GPS receiver with associated GPS antenna, and a gyro data-determining means;
   the locating module is configured to receive wheel speed data and forward/backward direction of travel data via the data bus;

the locating module is further configured to determine position data and to output said altitude position data onto the data bus; and the gyro data-determining means comprises one of gyro data-sensing means in the form of a gyroscope, and means for the bus-end reception and evaluation of gyro data of a travel dynamics/traction control system.

2. The vehicle data bus system according to claim 1, further comprising means for providing location precision classification information which indicates a degree of unreliability of calculated position data.

3. The vehicle data bus system according to claim 2, wherein the locating precision classification is output onto the data bus.

4. The vehicle data bus system according to claim 1, wherein the locating module contains an integrated GPS antenna.

5. The vehicle data bus system according to claim 1, further comprising an additional bus user in the form of a navigation unit, which receives vehicle position data from the locating module via the data bus, and by means of a map-matching process determines position correction data, which it inputs into the data bus in order to feed it back to the locating module.

6. The vehicle data bus system according to claim 5, wherein the navigation unit determines a corrected, precise vehicle position with a new locating precision classification and outputs it onto the data bus.

7. The vehicle data bus system according to claim 5, wherein the navigation unit determines accompanying travel network information and outputs it onto the data bus.

8. The vehicle data bus system according to claim 1, wherein:

the locating module is part of a further bus user; and the locating computing unit is used by the further bus user, for additional tasks.

9. A vehicle data bus system comprising:

a data bus which connects a plurality of bus users in data communication with one another; and locating apparatus, including a locating module connected as one of the bus users, said locating module being configured to determine vehicle position data, direction of travel angle data and travel speed data, and to output this determined data onto the data bus; wherein, the locating module has a locating computing unit and a locating sensor system which comprises at least a GPS receiver with associated GPS antenna and gyro data-determining means;

the locating module is configured to receive wheel speed data and forward/backward direction of travel data via the data bus;

the locating module is further configured to determine altitude position data and to output acquired altitude position data onto the data bus; and the gyro data-determining means comprises one of gyro data-sensing means in the form of a gyroscope, and means for the bus-end reception and evaluation of gyro data of a travel dynamics/traction control system; and the bus system includes at least one telematics service unit coupled thereto as a bus user, which uses data acquired from the locating module or from a navigation unit.

10. A vehicle data bus system comprising:

a data bus which connects a plurality of bus users in data communication with one another; and locating apparatus, including a locating module connected as one of the bus users, said locating module being configured to determine vehicle position data, direction of travel angle data and travel speed data, and to output this determined data onto the data bus; wherein, the locating module has a locating computing unit and a locating sensor system which comprises at least a GPS receiver with associated GPS antenna and gyro data-determining means;

the locating module is configured to receive wheel speed data and forward/backward direction of travel data via the data bus;

the locating module is further configured to determine altitude position data and to output acquired altitude position data onto the data bus; and the gyro data-determining means comprises one of gyro data-sensing means in the form of a gyroscope, and means for the bus-end reception and evaluation of gyro data of a travel dynamics/traction control system; and said altitude position data from the locating module is supplied via said data bus to an engine or gear box control as a further bus user, which uses said altitude position data in place of data from a separate altitude sensor.

* * * * *